Sept. 22, 1953

H. M. HUGE 2,653,293

BATTERY CHARGER

Filed Oct. 17, 1947

INVENTOR.
HENRY M. HUGE

BY Hoodling and Krost

ATTORNEYS.

INVENTOR.
HENRY M. HUGE
BY Hoodling and Krost
ATTORNEYS.

Sept. 22, 1953  H. M. HUGE  2,653,293
BATTERY CHARGER
Filed Oct. 17, 1947  5 Sheets-Sheet 4

INVENTOR.
HENRY M. HUGE
BY Stoodling and Krost
ATTORNEYS.

INVENTOR.
HENRY M. HUGE
BY Woodling and Krost
ATTORNEYS.

Patented Sept. 22, 1953

2,653,293

UNITED STATES PATENT OFFICE 2,653,293

BATTERY CHARGER

Henry M. Huge, Lorain, Ohio, assignor to Lorain Products Corporation, a corporation of Ohio Application October 17, 1947, Serial No. 780,408

12 Claims. (Cl. 321—25)

My invention deals with a regulated battery charging system or equivalent direct current supply system and in particular with an arrangement for supplying a constant rectified output voltage to a variable load from a source of alternating current having a variable voltage.

An object of my invention is to provide a rectifying system capable of maintaining a constant output voltage in spite of variations in the load current and in spite of variations in the voltage of the energizing alternating current source.

Another object of my invention is to control the output of a rectifying system by means of direct-current saturated core reactors and to accomplish the regulation with relatively small reactors and to minimize the size of the required rectifying elements.

Another object of my invention is to provide a rectifying system controlled by direct current in which the controlling current is a small percentage of the current which is controlled.

An additional object of my invention is to reduce the peak inverse voltage applied to the rectifiers in a rectifying system controlled by saturated core reactors.

A further object of my invention is to provide a regulating system in which a single winding acts both as a regulating reactance winding and a direct current saturating winding.

Another object of my invention is to utilize a source of reference potential and to regulate the output voltage of a rectifying system by comparing its output voltage with the reference potential.

A still further object of my invention is to provide a regulating system in which the regulated output voltage is independent of the characteristics of the power rectifiers.

An additional object of my invention is to provide a regulated rectifying arrangement which maintains a constant output voltage for all values of load current up to a specified maximum and thereafter limits the load current to a safe value.

Another object of my invention is to provide an improvement in the regulating characteristics of a direct current saturated reactor in a rectifying system by the provision of an alternating current shunting path across the direct current terminals.

Other objects and a better understanding of my invention will be obtained by referring to the following specification and claims together with the accompanying drawings in which:

Figure 1:
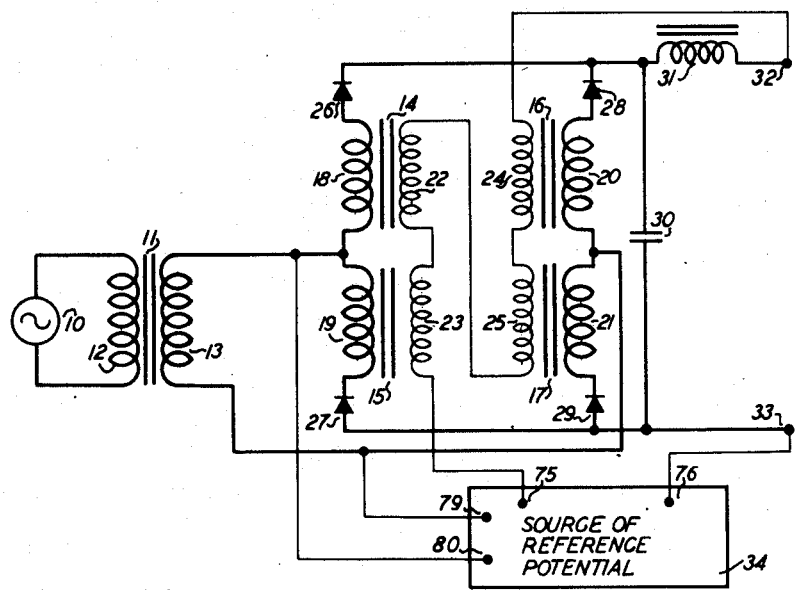
Figure 1 shows a circuit diagram of an embodiment of my invention in which a single-phase rectifying circuit is controlled by a source of reference potential.

Direct current controlled reactors have been used in numerous circuits in the past for the purpose of regulating the output of a rectifying arrangement. The arrangements known in the art have in general been characterized by several short-comings. In the first place they introduced a considerable reactive voltage drop in the A. C. lines and also a considerable resistive voltage drop in the direct current output leads. The arrangements have therefore been characterized both by poor power factor and poor efficiency as compared with unregulated rectifying arrangements. Accompanying the poor efficiency, there was the requirement that the series reactor be large enough to dissipate the losses incurred in the circuit, and consequently a large and costly reactor was required.

At the same time, the high voltage drop in the A. C. lines produced distortion of the voltage and resulted in a high peaked voltage being applied to the rectifiers. As is well known, the most efficient rectification can be obtained when a flat-topped voltage wave is applied to the rectifiers. By my invention I am able to greatly increase the efficiency of rectification by the application of a suitably shaped voltage wave to the rectifiers which minimizes the back voltage applied to them and at the same time maintains a maximum output voltage for a given applied voltage.

In general the circuits of the prior art have been characterized by a relatively insensitive control characteristic, so that in order to produce a change in the voltage output a relatively large control current was applied to the controlling reactor. When the output voltage was to be controlled by a source of reference potential, it therefore became necessary to provide amplifiers and other regulating arrangements to increase the correcting current obtained by comparison of the output voltage to the reference potential. My invention, however, embodies a controlling arrangement of extremely high sensitivity, and I am therefore able to compare the output voltage of the regulating arrangement with a reference potential and to use the detected differential directly, without any amplification, to control the saturation of the controlling reactors.

With prior devices using dry disk rectifier elements, the peaked voltage wave produced has necessitated the use of 25% to 30% more rectifier elements than would be required for unregulated rectification. By my invention, however, the number of dry disk rectifying elements is in most cases, maintained at the same number as would be required for unregulated rectification.

Other advantages and features of my invention will be clarified by the detailed description of the embodiments of my invention shown in the drawings.

Figure 1 shows a regulated rectifying arrangement comprising four controlling reactors 14, 15, 16 and 17 connected in series with four half-wave rectifying elements 26, 27, 28 and 29 respectively, and energized from a single-phase source of alternating current 10 through an insulating transformer 11, having primary winding 12 and secondary winding 13. The current through each of the half wave rectifying elements 26, 27, 28 and 29 is controlled by its respective regulating reactor winding with which it is connected in series. Thus, the reactor winding 18 in series with the rectifier 26 serves to limit the flow of current through the rectifier. The core 14 of this reactor is magnetized by the unidirectional current flowing through winding 18 so that the winding 18 acts not only as a reactance winding but also as a saturating winding for the reactor 14.

In the circuit of Figure 1, each of the 18, 19, 20 and 21 reactance windings carries current during substantially one half of an alternating current cycle and is idle during the other half cycle. Thus, winding 18 and winding 21 carry current during the one half cycle and winding 19 and winding 20 during the other half cycle. Inasmuch as two windings always carry substantially the same current, they may be wound on a single core, that is to say, reactors 14 and 17 may be combined on one core and reactors 15 and 16 on another core without altering the method of operation or the essential characteristics of the device. An advantage may be gained in addition to the reduction of the number of pieces by this modification, because the control magnetization of windings 22 and 25 is then added together in one core and likewise the control magnetization of windings 23 and 24. The control is then accomplished with two windings, 22 and 25 comprising the one winding, and 23 and 24 the other.

Winding 18 has an extremely high reactance when a light load current flows through the winding. As the load current increases, the direct current saturation of the core 14 produces a rapid decrease in the impedance of winding 18. Consequently, as heavy load conditions are encountered, the series reactance is very greatly reduced and as light load conditions are encountered the series reactance is greatly increased. This arrangement is capable of correcting for the series resistance in the circuit elements, including the transformer windings 12 and 13, the rectifiers, and the various elements in the direct current output circuit, such as the filter choke 31. This compensation may be more or less than that required to maintain a steady value of output voltage across the D. C. output terminals 32 and 33. In general, as the voltage of source 10 diminishes the compensation proves to be insufficient and as the voltage of source 10 increases the compensation proves to be more than adequate.

In spite of these variations however, my invention makes it possible to maintain a constant value of output voltage at the D. C. output terminals 32 and 33. I accomplish this by use of a source of reference potential 34. The D. C. voltage appearing across the terminals 75 and 76 of the source of reference potential is maintained at a substantially constant value and compared with the voltage appearing across the terminals 32 and 33. When any differences in voltage exists between that across the terminals 32 and 33 and across 75 and 76 a current flows through the control windings 22, 23, 24 and 25 on the reactors 14, 15, 16 and 17 respectively. For example, if the potential of the terminal 75 becomes greater than the potential of the terminal 32, a current flows from the terminal 75 to the terminal 32 through the control windings previously mentioned. This control current is in the same direction as the magnetizing current of the reactors on which the control windings are wound, so that it has the effect of reducing the series reactance in the circuit below the value it would have without the control current.

The reduction in reactance produces an increase in the voltage across terminals 32 and 33, so that the voltage across terminals 32 and 33 is automatically maintained at substantially the same value as the voltage across terminals 75 and 76. There may be a difference in voltage between terminal 75 and terminal 32 as a result of the resistance drop through the control windings, but, as previously mentioned, the arrangement is so sensitive to changes in control current, that only a relatively small current is required to maintain the output voltage constant and the resistance drop through the circuit may be made negligible by proper design.

The desired output voltage is obtained by making the voltage of the reference source substantially that which is required at the load.

The source of reference potential 34 shown in Figure 1 has not been described in detail because numerous variations may be employed in the practice of my invention. In Figure 1 the source 34 is shown having alternating current input terminals 79 and 80 which are used to energize the source of reference potential when it requires energization, as when the reference potential circuit is like that shown in either of the Figures 5, 6 or 7.

The direct current filter inductance 31 cooperates with the filter condenser 30 across the direct current output of the rectifiers to filter the ripple out of the output voltage. I have found that the regulating properties of the circuit in Figure 1 depend to a great extent upon the alternating current impedance which exists in the direct current circuit. I have also found that when the alternating current impedance of the direct current circuit is of a high value the peak inverse voltage on the rectifiers exceeds its normal value by as much as 70%. This marked change in characteristics apparently results from the change in the shape of the current wave through the reactance windings. In the case where no path for alternating current is provided in the direct current circuit, the sum of the currents through the various direct current paths must always add up to a constant value. If the direct current circuit includes an alternating current path, as is provided by capacitor 30, the currents through the various controlling reactors can fluctuate independently. I have found that the use of capacitor 30 in the circuit of Figure 1 causes the control circuit to respond much more easily to current from the source of reference potential. I have also found that the reactors of a given size are capable of maintaining a constant output voltage over much wider voltage regulating range when capacitor 30 is in the circuit than when capacitor 30 is omitted. Furthermore, the capacitor 30 causes the control reactors to act, to a certain extent, as filter inductances, so the ripple voltage across the output terminals 32 and 33 may be greatly reduced by this combination.

In the circuit of Figure 1 one side of the control winding 24 is connected directly to the positive output terminal 32, so that the voltage which is detected for comparison with the source of reference potential is the actual output voltage, and in case an appreciable voltage drop occurs through the filter inductance 31 this voltage drop will be corrected by the controlling current from the source of reference potential. The voltages induced in the control windings 22, 23, 24 and 25 are substantially cancelled by the phasing of the windings, that is to say, the voltage across winding 22 is substantially equal and opposite to the voltage across winding 23 and the voltage across winding 24 is substantially equal and opposite to the voltage across winding 25. The fundamental components of these voltages substantially cancel each other and the harmonic components are of relatively little importance in the operation of the circuit provided that the source of reference potential is provided with means for rendering it insensitive to these harmonic voltages.

Figure 2:
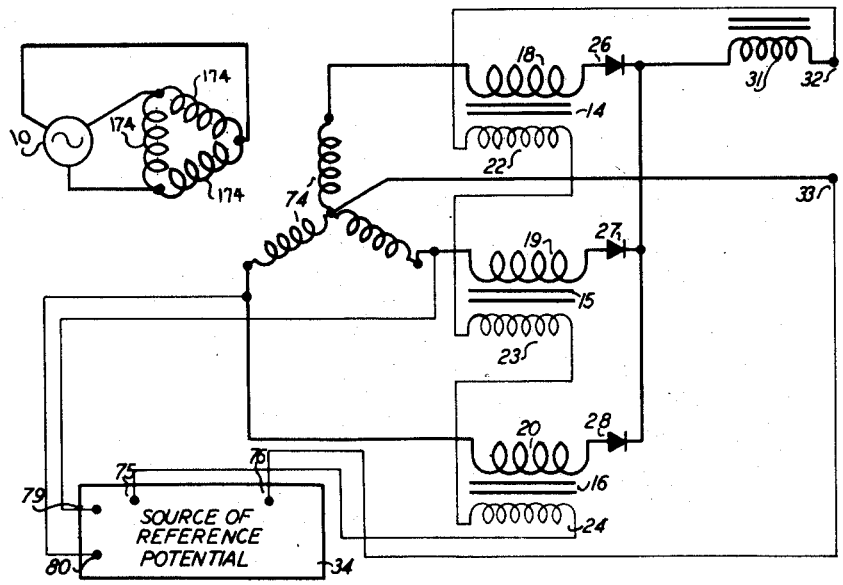
Figure 2 shows an embodiment of my invention utilizing a three-phase center-tapped arrangement.

In Figure 2, my invention is applied to a three-phase center-tapped rectification system supplied from a transformer having a star connected secondary 74 and a primary 174 energized from the source 10. The operation of the circuit of Figure 2 is similar to that of the circuit of Figure 1 in that each of the half-wave rectifiers 26, 27 and 28 is supplied through a reactor which controls the current through the rectifier. The reactors 14, 15 and 16 control the current through the rectifiers as in Figure 1, reactance winding 18 being in series with rectifier 26, winding 19 in series with rectifier 27, and winding 20 in series with rectifier 28.

The star midpoint of the transformer 74 is connected to the negative output terminal 33, while the positive terminal 32 is connected to the rectifiers through the filter inductance 31. I have found that with the circuit of Figure 2, the inductance 31 has a much smaller influence on the regulating properties of the arrangement than is observed in a single-phase circuit. Because of this fact, the condenser 30 used in Figure 1 has been omitted from Figure 2, without seriously disturbing the regulating properties of the circuit. Of course the omission of condenser 30 results in a loss of filtering effectiveness, but this is of minor importance in many cases.

In the circuit of Figure 2, each of the reactors carries current during approximately one third of the cycle, and although this results in a relatively inefficient use of the conductors carrying current, it also results in a relatively efficient use of the magnetic material, since the reactors have a correspondingly greater impedance to the shorter pulses of current. As in Figure 1, the D. C. component of the current through the reactor windings saturates the reactors in accordance with the load current and relieves the control windings of the need for supplying anything but a very small control current to regulate the output voltage.

The reference source 34 is shown in Figure 2 as in Figure 1 and has output terminals 75 and 76 connected in parallel with the power output terminals 32 and 33 through the control windings 22, 23 and 24. The alternating current input terminals 79 and 80 are used when the reference source is energized by the alternating current source.

Figure 3:
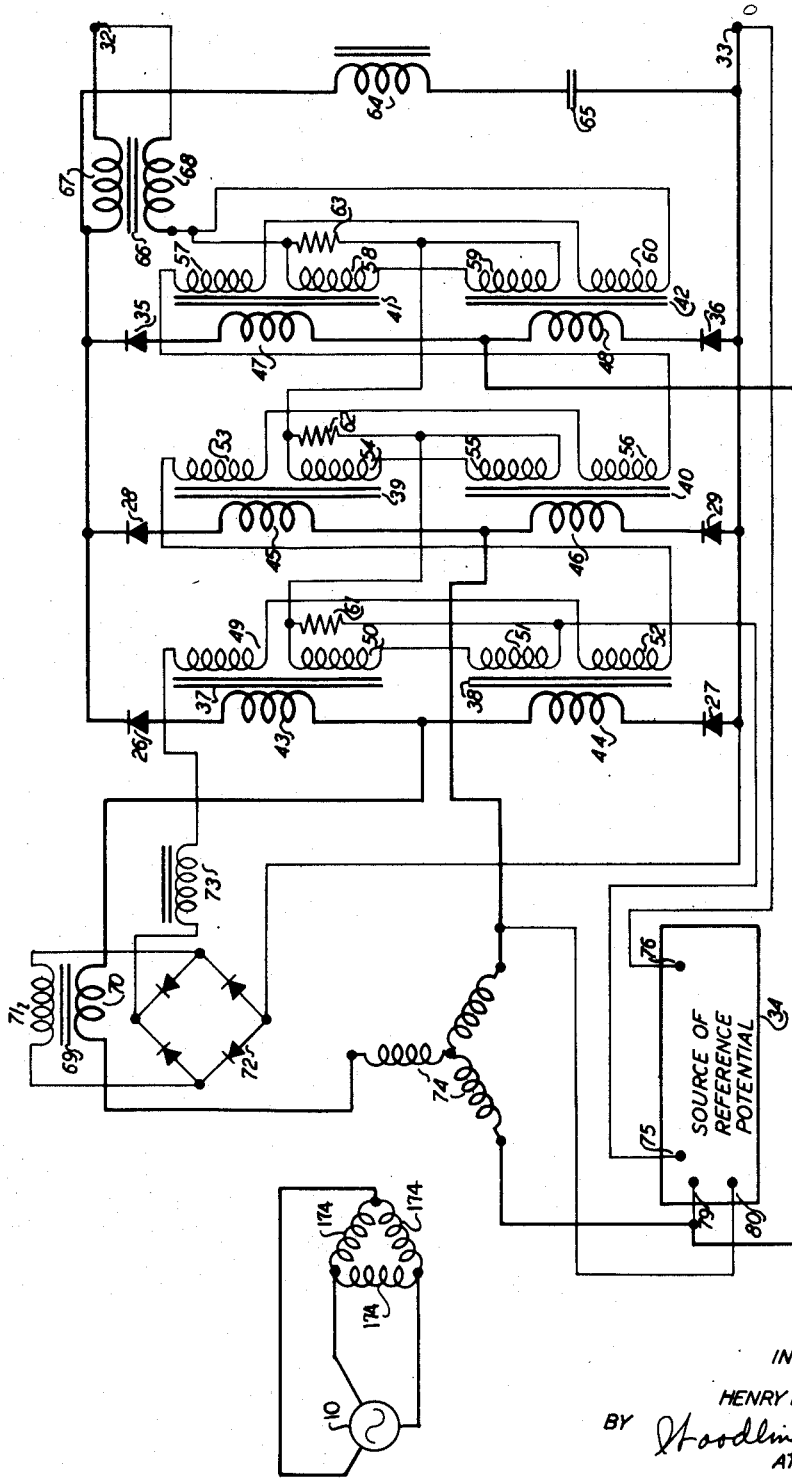
Figure 3 shows a three-phase full-wave rectifying arrangement regulated by a source of reference potential and with an overload protection arrangement.

Figure 3 shows how my invention may be applied to a three-phase full-wave rectifying arrangement energized from the transformer having a star-connected secondary 74 and having a primary 174 energized from the source 10. As in the previous figures, each rectifier element is connected between an alternating current terminal and a direct current terminal in series with a reactance winding. The reactors 37, 38, 39, 40, 41 and 42 control the currents through the rectifiers 26, 27, 28, 29, 35 and 36 respectively.

Thus, the impedance winding 43 on reactor 37 is in series with rectifier 26, the impedance winding 44 or reactor 38 is in series with the rectifier 27, the impedance winding 45 on reactor 39 is in series with the rectifier 28, winding 46 on reactor 40 is in series with the rectifier 29, winding 47 on reactor 41 is in series with rectifier 35, and winding 48 on reactor 42 is in series with rectifier 36.

Each of these impedance windings not only acts as an impedance winding but also as a saturating winding for its respective reactor, inasmuch as the current which it controls comprises a considerable D. C. component. As the load current increases, this D. C. component of the current through the reactor winding saturates the reactor core. As in Figures 1 and 2, this arrangement eliminates the need for separate saturating windings and impedance windings on the controlling reactor. As in the previous figures, the elimination of the saturating winding results not only in a saving in space, but also in a considerable reduction in the D. C. resistance in the circuit. The saving in direct current resistance in the circuit results in a higher efficiency, a smaller unit, and in addition there is a gain resulting from the fact that the saturation is accomplished, for the most part, by the impedance winding. In this manner leakage reactance effects are minimized, and under the saturated condition the impedance of the winding falls to an extremely low value which is, in general, lower than could be obtained were the saturation accomplished by a separate winding.

Furthermore, the circuit arrangement used, particularly in Figure 3, impresses a steep wave front on the reactors. The individual rectifiers pass current for less than one-half of the time, and the current through each rectifier therefore represents a relatively short pulse of current. The fact that a steep wave front is impressed on the reactors enhances the reactor's ability to limit the current. This characteristic will become clarified when it is understood that the action of the reactor is merely that of an inductance, in which the induced voltage depends upon the rate of change of current.

As previously mentioned, the saturation of the reactor cores is accomplished mainly by the current flowing through the impedance windings, but there is also a control current impressed on these cores by means of the control windings 50, 51, 54, 55, 58 and 59. The current through the control windings represents a relatively small factor in the saturation of the cores because the control arrangement is so sensitive that relatively little control current is required.

As in Figures 1 and 2, the circuit of Figure 3 includes the source of reference potential 34, having direct current output terminals 75 and 76, the negative terminal 76 being connected to the negative terminal 33 of the main rectifying system and the positive terminal 75 being connected to the positive terminal 32 of the main rectifying system through the control windings previously mentioned.

In Figure 3 the reference potential source is connected to the terminal 32 through the winding 68 on the filter inductance 66. This circuit is employed in order to eliminate the effects of the direct current drop through the resistance of the filtering winding 67, and it has the additional advantage that in case there is a transient load impressed on the terminals 32 and 33, the current from the source of reference potential will not be caused to fluctuate unnecessarily by the voltages induced in the filter inductance from the load transients. I prefer to construct the inductance 66 with substantially equal turns on the windings 67 and 68.

With this arrangement the D. C. potential against which the source of reference potential is compared is that of the output voltage which is to be maintained constant, but in case of a transient condition occurring and producing a voltage across the filter winding 67, this voltage also appears across winding 68 so that the source of reference potential does not attempt to correct for voltage variations caused by transients. As in Figure 1, when the output voltage across terminals 32 and 33 falls below the voltage of the reference potential source as a result of a change in input voltage or a change in load, an unbalance current is caused to flow through the control windings 50, 51, 54, 55, 58 and 59. This current is in the same direction as the main saturating current for the reactors so that the reactor impedances are further reduced below their initial value, and the output voltage at terminals 32 and 33 is brought back to essentially the same value as the voltage across terminals 75 and 76. Because the output voltage is always corrected to the value set by the source of reference potential, changes in resistance of the power rectifiers resulting from aging or temperature changes are automatically corrected.

The circuit of Figure 3 shows another feature of my invention in the control circuit. The resistor 61 is connected across windings 50 and 51 in series, the resistor 62 is connected across windings 54 and 55 in series, and the resistor 63 is connected across windings 58 and 59 in series. The fundamental frequency voltage across winding 50 is substantially equal and opposite to that across winding 51, so that relatively little fundamental frequency voltage is impressed on the resistor 61. The resistor effectively short-circuits the harmonic frequencies which were mentioned in connection with Figure 1. Resistor 61 is preferably made with a realtively high resistance as compared with the D. C. resistance of the windings 50 and 51, while at the same time it can effectively act as a short circuit to alternating current in this portion of the circuit.

I have found that the addition of the resistors 61, 62 and 63 results in an effective reduction in the overall impedance of the control elements, and consequently makes it possible to obtain a given output voltage at terminals 32 and 33 with a somewhat lower voltage applied from the transformer winding 74. At the same time the peak inverse voltage on the rectifier elements is reduced by the insertion of the resistors 61, 62 and 63. Furthermore, these resistors have a damping effect and aid in preventing "hunting" in the control circuit, which might otherwise occur because of the sensitivity of the control arrangement.

In Figure 3, the tuned circuit comprising the inductance 64 and capacitor 65 shunted across the direct current terminals of the rectifiers takes the place of the capacitor 30 in Figure 1. This tuned circuit provides the alternating current path which is provided by the capacitor 30 in Figure 1. The circuit is preferably tuned to series resonance at the sixth harmonic of the fundamental frequency supplied by transformer 74. Thus, the resonant circuit is tuned to short circuit the fundamental frequency of the ripple voltage produced by the rectifying arrangement, which in this case amounts to the sixth harmonic of the energizing frequency. Although the capacitor 30 in the circuit of Figure 1 has considerable influence on the regulating characteristics of the single-phase circuit, this is not necessarily true in the three-phase circuit shown in Figure 3. I have found that the ability of the reactors to regulate the output voltage in the circuit of Figure 3 is influenced to a relatively small extent by the alternating current impedance which appears across the direct current terminals. Nevertheless, the use of the alternating current path comprising inductance 64 and capacitor 65 across the direct current output of the rectifiers is highly desirable for several reasons. First among these reasons is the substantial reduction in the peak inverse voltage across the rectifier elements, and second is the reduction in the ripple voltage which has to be filtered out by the filter inductance 66. I have found that unless a path for the ripple current is provided across the D. C. terminals of the rectifiers, the ripple voltage rises to an unusually high value, making the filtering a much greater problem than would normally be expected. At the same time, this high value of ripple voltage is impressed as a back voltage on the rectifier elements, and the peak inverse voltage across these elements is increased to a point which requires an increase in the number of elements used in order to prevent breakdowns. In my invention, I overcome these difficulties and provide a path for the ripple current, so that the ripple voltage at the rectifier terminals is kept at a low value and the peak inverse voltage across the rectifier elements is likewise reduced. The reference potential source 34 in Figure 3 is shown having A. C. input terminals 79 and 80 for energization from the alternating current source, as in Figure 1.

Figure 3 also shows an arrangement for limiting the output current to a safe value. When a battery charger is used to maintain a constant voltage across the terminals of a storage battery, there are occasional instances when the charger must work into a discharged battery such as, following a failure of the A. C. voltage, or when a new battery is installed. In these cases the battery charger tends to maintain the same voltage across the battery terminals as when the battery is fully charged and consequently delivers an abnormally large current output. The large current flow under this condition might cause damage to the transformers or rectifiers, but by my invention I am able to overcome this difficulty and limit the current to a safe value, without in any way detracting from the regulating properties of the circuit so long as normal load current is maintained. I accomplish this by the use of an additional rectifier bridge 72 feeding current through an additional set of control windings 49, 52, 53, 56, 57 and 60. The rectifier bridge 72 is energized from the secondary winding 71 of transformer 69. The primary winding 70 of transformer 69 is in series with one of the phases of the A. C. input current. With this arrangement the voltage produced across the winding 71 depends upon the amount of current flowing through winding 70. I prefer to construct the transformer 69 with a relatively linear excitation characterisitc for this purpose, so that the voltage across winding 71 has a linear dependence on the current through winding 70. This may be accomplished in well-known manner by providing the core of transformer 69 with an air gap in its flux path. As the current through winding 70 increases, the rectified output voltage delivered by the rectifier bridge 72 also increases, and eventually this voltage reaches a value equal to the terminal voltage across terminals 32 and 33. As long as the voltage delivered by rectifier 72 is less than the rectified output voltage at terminals 32 and 33, relatively little current flows through the control windings in this circuit because the current is limited by the reverse resistance of the rectifier bridge 72. As the rectified voltage of rectifier 72 exceeds the terminal voltage across terminals 32 and 33, the current flows from the rectifier 72 to the terminals 32 and 33.

I prefer to include the filter inductance 73 in series with the output of rectifier 72 so that the current will not flow in any appreciable quantity through the control windings supplied by rectifier 72 until the average value of the rectified voltage equals the output voltage. The circuit constants are adjusted so that the output voltage of rectifier 72 equals the nominal output voltage of the regulator when the current output of the device reaches its maximum safe value. If the load current exceeds this value, the voltage produced by the rectifier 72 exceeds the voltage across terminals 32 and 33 and current is caused to flow through the control windings 49, 52, 53, 56, 57 and 60.

This control current is in the opposite direction to the saturating current of the main windings on these reactors, so that the effect of the current supplied by rectifier 72 is to demagnetize the reactor cores. As the cores are demagnetized, the impedance of the control windings increases, and the output voltage at terminals 32 and 33 is reduced to maintain a safe value of current through the rectifiers. The action here is cumulative, that is to say, as the voltage at terminals 32 and 33 falls, a greater current tends to flow from the rectifier 72, inasmuch as it is now opposing a lower voltage. I prefer to construct the circuit elements so that this cumulative action is substantially equivalent to the amount of voltage drop through the controlling windings 49, 52, 53, 56, 57 and 60. By this action, therefore, I am able to maintain a relatively constant current output from the battery charger once the rectifier 72 begins to come into operation. The control of the reactor cores 39 to 42 inclusive, requires relatively little energy from the controlling source, and therefore the transformer winding 70 need introduce a relatively little voltage drop in the circuit, and the unbalance resulting from the use of a single-phase transformer is not serious. This arrangement can be applied equally well to the circuits of Figures 1 and 2.

As long as the load current is less than the specified value, the voltage produced by rectifier 72 is less than the terminal voltage across terminals 32 and 33 and consequently, no appreciable current flows through the control windings 49, 52, 53, 56, 57 and 60. My invention therefore makes it possible to regulate the overload current of the device very accurately to a safe value, while at the same time having no effect on the regulating properties of the circuit at normal load conditions.

Figure 4:
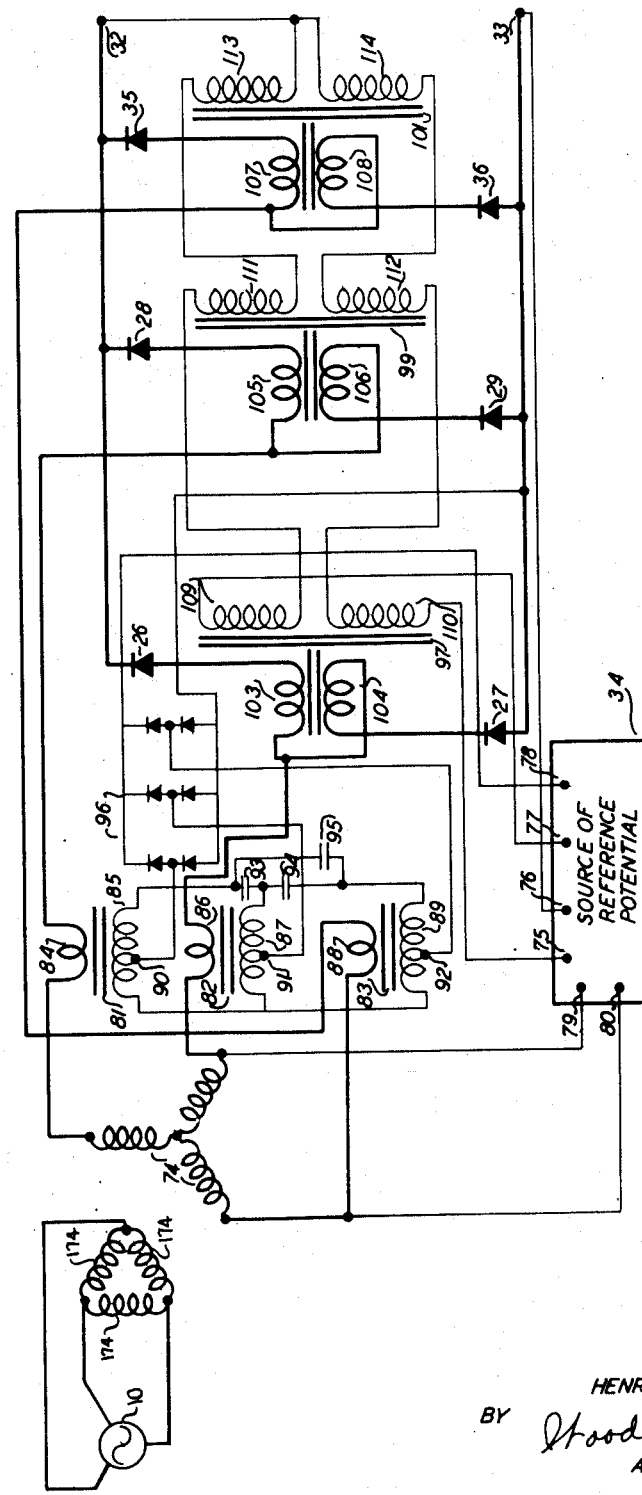
Figure 4 is another embodiment of my invention utilizing a three-phase controlled rectifying arrangement with the control reactors wound on three-legged cores.

Figure 4 shows the schematic diagram of another embodiment of my invention applicable to three-phase rectification. The rectifying arrangement of Figure 4 is energized from the secondary windings 74 of a transformer whose primary windings 174 are energized from the source 10. The six control reactors shown in Figure 3 are replaced in Figure 4 by three, three-legged reactors designated by the T-shaped structures 97, 99 and 101. This symbolic representation of a three-legged reactor indicates the central member of the reactor as the cross-bar of the T, and the two outside members by the stem of the T. Thus, the three-legged reactor 97 has the control windings 109 and 110 on its central core member and the reactance windings 103 and 104 respectively on its two outer members.

The reactance windings 103 and 104 are polarized in the opposite direction to that normally used for three-legged reactors, so that the direct current magnetization produced by the windings 103 and 104 magnetizes the central core member on which the windings 109 and 110 are located. With this arrangement the action of the control element is very similar to that obtained by the two control elements 37 and 38 in Figure 3, inasmuch as the flux produced by the winding 103 circulates through this winding and through the central core member without appreciable effect on the winding 104 and conversely the flux produced by winding 104 circulates through this winding and through the central core member without appreciable effect on winding 103.

The use of the three-legged reactors as in Figure 4 produces an advantage over the use of the six individual reactors in Figure 3. The control arrangement in Figure 4 uses just half as many windings as does the control arrangement in Figure 3. Inasmuch as the difference between the regulated output voltage of the battery charger and the output voltage of the source of reference potential is the resistance drop through the control windings, a considerable advantage is gained by cutting the number of control windings in half. At the same time I have found that no disadvantage is incurred in having the control winding on a different member of the core than the reactance winding which also acts as the main saturating winding. This is true because the reactance or saturating winding magnetizes its own core member to the required degree of saturation without any assistance from the control winding. The magnetizing force provided by the control winding is only a small percentage of the total magnetizing force used, and consequently it is spent in the central core member. There is, therefore, no noticeable tendency for leakage-reactance to play a part since the impedance windings, for example windings 103 and 104, provide the main saturation of the core 97 associated therewith.

The circuit of Figure 4 likewise effects a reduction in the total number of circuit elements required, since the three, three-legged reactors 97, 99 and 101 in Figure 4 take the place of the six reactors used in Figure 3.

As previously mentioned, the reactance windings, 103 to 108 inclusive, of the three-legged reactors 97, 99 and 101 are placed one on each of the two outer core members. The direct current magnetization produced by these reactance windings is polarized so as to magnetize the central core member, but the alternating current magnetization produced by these two windings tends to cancel out of the central core member. Therefore the voltage produced across winding 110 in Figure 4, for example, is substantially the same as the sum of the voltages produced across windings 50 and 51 in Figure 3.

The control action in Figure 4 is accomplished in much the same manner as in Figure 3, the reactance winding 103 in series with rectifier 26 controls the current through rectifier 26, the winding 104 controls the current through rectifier 27, winding 105 controls the current through rectifier 28, winding 106 controls the current through rectifier 29, winding 107 controls the current through rectifier 35, and winding 108 the current through rectifier 36. The source of reference potential 34 in Figure 4 has its negative terminal 76 connected to the negative terminal 33 of the system. The positive terminal 75 is connected to the positive terminal 32 of the system through the control windings 110, 112 and 114. As previously explained, any difference in voltage between the source of reference potential and the rectified output voltage at terminals 32 and 33 results in a flow of current through these windings, and in turn corrects the voltage at the output terminals to the desired level, which is essentially the output voltage of the reference source.

The overload protection arrangement shown in Figure 4 makes use of a three-phase rectifier bridge 96 in place of the single-phase rectifier 72 shown in Figure 3. This rectifier bridge 96 is energized from the secondary windings 85, 87 and 89 of the current transformers 81, 82 and 83. The rectifier is connected to taps 90, 91 and 92 respectively on the three windings, while the capacitors 93, 94 and 95 are connected in delta arrangement across the terminals of the windings 85, 87 and 89, which are connected in a star arrangement. The primary windings 84, 86 and 88 of the three transformers are respectively connected in series with the three output leads of the transformer secondary 74.

In the arrangement shown in Figure 3, the linear excitation characteristic of the transformer 69 was used to maintain a linear relationship between the output voltage of rectifier 72 and the load current. In the arrangement of Figure 4, the capacitors 93, 94 and 95 serve as linear impedance elements across which a voltage is developed which is proportional to the load current flowing through windings 84, 86 and 88. These capacitors serve several purposes; firstly, they act as linear impedance elements as previously mentioned, secondly, they act as filtering elements to substantially eliminate the harmonic voltages from the input voltage to the rectifier bridge 96, and thirdly, they act to introduce a capacitive reactance of relatively low value in series with the input leads to the rectifiers.

The operation of the overload protection arrangement in Figure 4 is based on the same general principles outlined in connection with the overload protection device shown in Figure 3. As the current output of the battery charger reaches a specified value, the voltage produced by the rectifier bridge 96 equals the output voltage at terminals 32 and 33. The negative side of the rectifier bridge 96 is connected to the negative output terminal 33, whereas the positive side of the rectifier bridge 96 is connected to the positive terminal 32 through the control windings 109, 111 and 113, and through the terminals 77 and 78 on the source of reference potential.

As long as the voltage produced by the rectifier 96 is less than the voltage across terminals 32 and 33, the reverse resistance of the rectifier 96 prevents the flow of current through the control windings 109, 111 and 113. When the load current reaches the specified value at which overload protection is to begin, the voltage of the rectifier 96 exceeds the voltage across terminals 32 and 33, and current is caused to flow through the control windings 109, 111 and 113. This current is in such a direction as to demagnetize the reactor cores 97, 99 and 101 and consequently increase the impedance of these elements to limit the flow of current to the output terminals 32 and 33.

Here again the reduction in voltage across the output terminals aids in maintaining a flow of current through these control windings, since the voltage across rectifier 96 gradually opposes a lower and lower output voltage. By this action, compensation for the resistances in the windings 109, 111 and 113 and the resistance of the rectifier 96 can be obtained so that once the overload protection device begins operating, a substantially constant value of output current may be maintained. The inductance 73 shown in the circuit of Figure 3 is not used in Figure 4. It is not necessary to include a choke for the purpose of differentiating between the crest value of the rectified voltage and the average value, because with the three-phase rectification provided by the rectifier 96, the average value is substantially equal to the crest value of the rectified voltage. Once the crest voltage exceeds the terminal voltage across terminals 32 and 33 satisfactory operation of the overload protection device is obtained.

The source of reference potential 34 shown in Figure 4 is provided with two additional terminals 77 and 78 through which the overload protection current is passed. The purpose of this arrangement is to provide for a control of the source of reference potential by the overload protection device.

As previously mentioned, the capacitors 93, 94 and 95 together with the transformers 81, 82 and 83 provide a low value of capacitive reactance in series with the input to the rectifiers. This value may be made extremely low so that it has relatively little effect on the operation of the circuit elements, because the amount of power required by the three-phase rectifier bridge 96 is very small compared with the total amount of power in the circuit. Nevertheless, in certain cases it may be desirable to use this capacitive reactance to counteract some of the inductive reactance provided by the control impedances. When this type of operation is desired, the transformers are designed to give, in combination with the capacitors, an effective value of capacitive reactance appreciably less than the minimum value of inductive reactance obtainable in the controlling reactors. This arrangement provides for a more complete elimination of all series impedance under the maximum load conditions so that a lower voltage from windings 74 may be used and a better power factor obtained.

Figure 5:
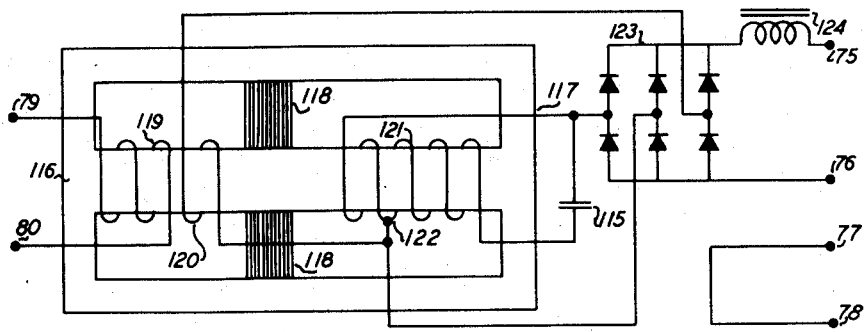
Figure 5 is a diagram of one type of reference potential source adaptable to the other figures.

Figure 5 shows an arrangement which can be used satisfactorily for the source of reference potential 34 in the figures shown. The structure of Figure 5 comprises a leakage-reactance core having a primary side 116 and a secondary side 117 with the leakage shunts 118 between the primary and the secondary. The primary winding 119 on the primary core side is energized from an alternating current source through the terminals 79 and 80. The secondary core portion 117 carries winding 121, across which is connected capacitor 115. The three-phase rectifier 123 is energized from a portion of winding 121 terminated at tap 122 and also from winding 120 which is coupled to the primary winding 119. This arrangement is capable of supplying a constant rectified output voltage regardless of variations of the A. C. input voltage, and in spite of variations in the load current drawn from the rectifiers. The operation depends upon the change from single-phase rectification under light load conditions to polyphase rectification under heavy load conditions. The method of operation is described more fully in U. S. Patent 2,364,558, issued December 5, 1944, to C. P. Stocker.

The filter inductance 124 in series with the rectified output serves to maintain a smooth output voltage wave for comparison with the output voltage of the main battery charger, and at the same time prevents any ripple voltage which might appear in the control windings from being rectified by the rectifiers 123 and thereby altering the regulated output voltage at terminals 75 and 76.

The terminals 77 and 78 in Figure 5 are shown shorted together, indicating that the overload control is not used to modify the output voltage of the reference source in this arrangement.

Figure 6:
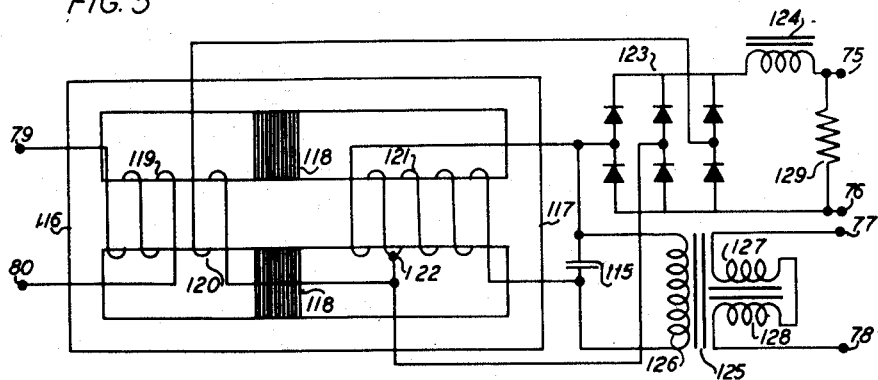
Figure 6 is another type of reference potential source.

Figure 6 shows a modification of the reference potential arrangement of Figure 5 in which the control current passed through terminals 77 and 78 is used to decrease the reference potential under overload conditions. To accomplish this action, the three-legged reactor designated by the T-shaped figure 125 in Figure 6 is used. The T-shaped figure indicates a three-legged core structure, in which the cross-bar of the T designates the central core member and the stem of the T designates the two outer core members, on which are wound respectively the control windings 127 and 128. The impedance winding 126 on the central core member is connected in parallel with capacitor 115.

The windings 127 and 128 are connected in series and are polarized so that the A. C. voltage induced in winding 127 is out of phase with the voltage in winding 128. The windings 127 and 128 are preferably substantially alike, so that the voltages cancel and the terminals 77 and 78 are not subjected to an alternating current from the windings 127 and 128.

When an overload occurs on the main battery charger, current is passed through the windings 127 and 128 by the overload protection rectifiers. This current tends to saturate the core 125, causing the winding 126 to draw a larger inductive current in parallel with the capacitor 115. As the current increases through winding 126 it effectively reduces the capacity in the circuit and thereby reduces the voltage appearing across winding 121. Inasmuch as the rectifiers 123 are fed from voltage from winding 121, a reduction in this voltage results in a reduction in the reference potential across terminals 75 and 76. Under this condition, therefore, the reference potential is reduced and the output voltage at the terminals of the main battery charger is likewise reduced.

The purpose of this arrangement is to avoid an opposition between the source of reference potential and the overload protection rectifiers, which would tend to reduce the effectiveness of the overload protection rectifiers. As previously mentioned, the overload protection rectifiers reduce the output voltage of the main battery charger. If the source of reference potential is maintained in its normal operating condition, it feeds a large current through the control windings as a result of the reduction in the output potential of the main battery charger. With the arrangement shown in Figure 6 however, the reduction in the reference potential occurs simultaneously with the reduction in the output voltage at terminals 32 and 33 in the previous figures, and the current supplied by the source of reference potential does not become excessive under overload conditions.

The reference source shown in Figure 6 is provided with a bleeder resistor 129 connected across the terminals 75 and 76. The purpose of this resistor is to draw current from the source of reference potential so that under the conditions where the main battery charger does not require any current for controlling purposes, the voltage of the reference source does not tend to rise from lack of loading. In fact, under some conditions, the main battery charger may require that a current be passed in the opposite direction through the control windings, so that the source of reference potential is called upon to absorb current from the battery charger rather than to supply it. In this case the resistor 129 is available to pass not only a small amount of current from the reference rectifiers 123, but also to absorb the reverse current from the main battery charger.

The operation of the leakage-reactance transformer in combination with the rectifiers 123 and the capacitor 115 is such that resistance in the circuit, such as the resistance of the filter inductance 124, the resistance of the rectifiers 123, and the resistances in the transformer windings, may be compensated for in order to maintain a constant voltage at terminals 75 and 76.

In the practice of my invention, the ideal condition to be sought after is the maintenance of a constant voltage across main power output terminals 32 and 33. I am able to achieve this ideal condition to a high degree of accuracy by causing the reference potential source to have a "climbing" characteristic. A close approximation to ideal operation is obtained by over-compensating the source of reference potential with regard to resistance in its output circuit. This means that it is compensated not only for the resistance in its circuit up to the terminals 75 and 76 of the reference source, but is also compensated for resistance in the control windings, such as the control windings 110, 112 and 114 in Figure 4. With this compensation, the source of reference potential maintains a substantially constant terminal voltage across output terminals 32 and 33 of the main power circuit without regard for the main power rectifiers 26, 27, 28, 29, 35 and 36. Naturally only a very small amount of current can be supplied by the reference source, but within its capacity it supplies constant voltage across terminals 32 and 33. In general, the amount of current available from the source of reference potential will be of the order of 1% of the total output current, so that a relatively small reference potential source is capable of controlling a very large battery charger system.

The terminals 32 and 33, across which a regulated voltage is maintained need not be located at the charger but may be at any desired point in the load circuit across which a regulated voltage is required. It is only necessary to bring the leads from the reference source out to the point in the circuit at which the regulated voltage is required, such for example, load terminals 32 and 33, so that the resistance drop in the circuit up to the load point is corrected by the control current. This load point in the circuit is designated by the terminals 32 and 33, and the connections from the control circuit are made to these terminals as indicated in the drawings.

Figure 7:
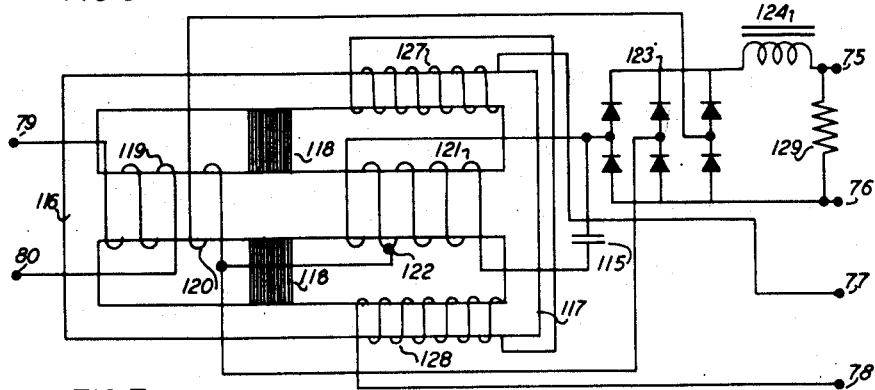
Figure 7 is still another type of reference potential source which is controlled by the overload protection arrangement.

Figure 7 shows a schematic diagram of another type of reference potential source which is very well suited to the practice of my invention. In the reference potential source of Figure 7 the secondary portion of the transformer core 117 carries the two control windings 127 and 128 on its outer core members. The windings 127 and 128 are substantially alike and polarized to cancel voltages of the fundamental frequency appearing in them as in Figure 6. However, in the operation of the circuit of Figure 7, the additional losses incurred by the introduction of the reactor 125 in Figure 6 are eliminated and the controlling action is applied directly to the regulating transformer. This arrangement is covered by U. S. patent application filed by G. H. Pohm entitled "Electric Control Apparatus" which application is identified as Serial No. 779,707, filed October 14, 1947, and assigned to the same assignee and which is now Patent No. 2,595,099. The operation of the circuit of Figure 7 is substantially the same as the operation of the circuit of Figure 5 so long as no control current is passed through the windings 127 and 128. However, when control current is passed through these windings via terminals 77 and 78, the core 117 becomes saturated and the voltage across winding 121 is reduced. The output voltage across terminals 75 and 76 naturally diminishes as a result of this action.

Figure 8:
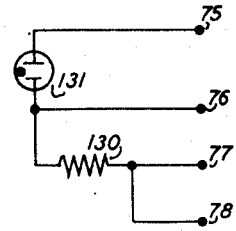
Figure 8 is a diagram of a reference potential source comprising a voltage regulator tube.

The source of reference potential 34 shown in the various figures need not necessarily be a source of current. Figure 8 shows an arrangement for using a voltage regulator tube, which is a current consuming device, as the source of reference potential. As is well known, the voltage across such a cold-cathode discharge tube can be maintained substantially constant over a wide range of current flowing through the tube, or in fact, the voltage may diminish with increase in the current flow. Thus, a constant potential can be maintained across terminals 75 and 76 and, by suitable operation and design of the voltage regulator tube 131, a certain amount of compensation for the resistance in the control windings can also be obtained.

Since this device is a current consuming device, the current through the windings which control the saturation of the reactors is in the opposite direction to that encountered with the arrangements of Figures 5, 6 and 7. This reverse current tends to oppose some of the magnetization provided by the main saturating windings on these reactors. In order to balance this action, the magnetization of these cores is maintained at the desired level by the introduction of the resistor 130 in Figure 8.

The effect of the resistor 130 in Figure 8 can be explained best by reference to Figure 4 when it is observed that the terminal 77 of the reference source 34 is connected to the positive side 32 of the output of the battery charger through the control windings 109, 111 and 113. The terminal 76 is connected to the negative output terminal 33. The resistor 130, which is shunted between terminal 77 and terminal 76 of the reference source, causes a current to flow from the positive terminal 32 through the control windings 113, 111 and 109 to the negative output terminal 33. At the same time there is a current flow through the voltage regulator tube 131 which flows through windings 114, 112 and 110. It will be observed that the polarity of the windings is such that the flow of current through winding 113 has the opposite effect as the flow of current through winding 114, and similarly for the windings on the other two reactors. Thus, the current passed by the resistor 130 corrects for the current consumed by the voltage regulator tube 131, making it possible to maintain the same degree of saturation in the cores with the arrangement of Figure 8 as is maintained with the arrangements of Figures 5, 6 and 7.

Figure 9:
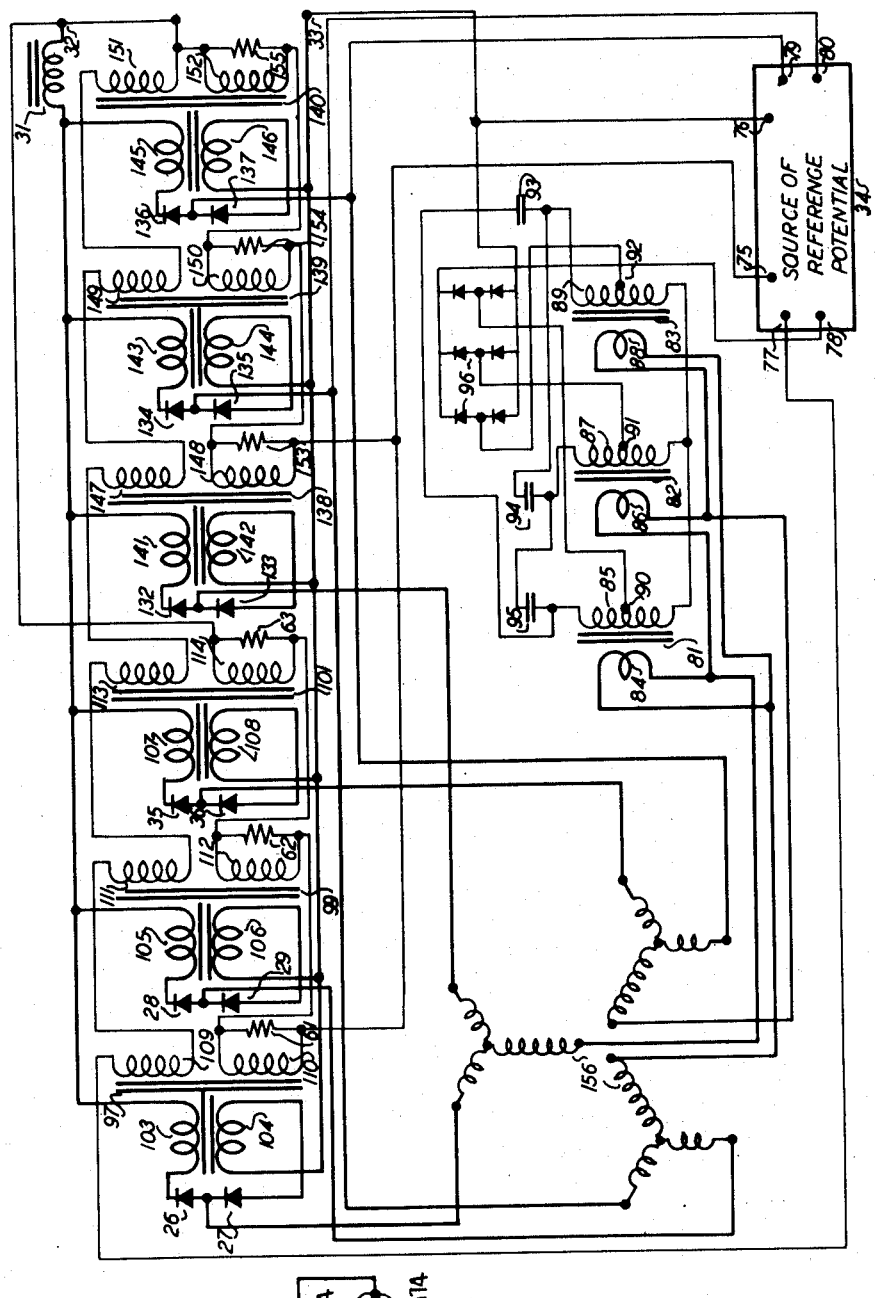
Figure 9 shows an embodiment of my invention utilizing six-phase rectification together with an overload protection arrangement.

In Figure 9 another embodiment of my invention is shown, in which six-phase rectification is employed. The control reactors of Figure 9 are similar in construction to those of Figure 4 and are designated by the T-shaped figures 97, 99, 101, 138, 139 and 140. On these cores, there are twelve impedance windings, 103, 104, 105, 106, 107, 108, 141, 142, 143, 144, 145 and 146 associated respectively with twelve rectifiers, 26, 27, 28, 29, 35, 36, 132, 133, 134, 135, 136 and 137. Each rectifier in series with its respective impedance winding constitutes a current path extending from an A. C. terminal to a D. C. terminal. There are twelve paths. Between each A. C. terminal and each D. C. terminal there is connected a rectifier in series with an impedance winding, thus, for example, rectifier 26 connected in series with impedance winding 103 constitutes one of the twelve paths and rectifier 27 connected in series with impedance winding 104 constitutes another of the twelve paths. It will be noted that in Figure 9 the order of the two elements in the circuit is reversed, that is to say, the rectifier 26 is connected to the A. C. terminal and the impedance winding 103 is connected to the D. C. terminal of the circuit. It will be recognized that, since this is a simple series circuit, the interchange of the order of these two elements has no effect upon the operation of the circuit.

In Figure 9 the transformer secondary windings 156 supply a six-phase output, or rather two three-phase outputs displaced in phase by 30° from each other. The three-phase primary 174 of this transformer is energized from the source 10. The transformer connections are shown symbolically with the windings oriented to designate their phase relationship, but no attempt is made to go into a detailed explanation of this portion of the circuit, inasmuch as arrangements of this type are known in the art.

The first group of three reactors, 97, 99 and 101 shown at the left side of Figure 9 corresponds to the reactors shown in Figure 4. The second group, 138, 139 and 140 shown at the right hand side of Figure 9 is similar to the first group and is energized from a three-phase source in essentially the same manner as is done in Figure 4. The windings 141 and 142 on reactor 138 are connected in series with rectifiers 132 and 133 respectively, the windings 143 and 144 on reactor 139 are connected in series with rectifiers 134 and 135 respectively, and the reactor windings 145 and 146 on reactor 140 are connected in series with rectifiers 136 and 137 respectively. This group of three reactors energized from a three-phase source operates in essentially the same manner as the other group of three reactors.

The 30° phase displacement between the energizing voltages of the second group of reactors and the first group of reactors, appears in the ripple voltage as 180° displacement in phase between the ripple voltage from the first group of rectifiers and the ripple voltage from the second group of rectifiers. This is true because the ripple frequency is six times the fundamental frequency, so that the phase displacement is also multiplied by six, and the 30° phase displacement becomes 180° displacement in the ripple voltages.

When the transformer 156 is energized from a 60 cycle source, the fundamental ripple frequency of 360 cycles which appeared in the circuit of Figure 4 is cancelled in the circuit of Figure 9 and the lowest ripple frequency which appears is 720 cycles, and this frequency appears at a much lower level than did the 360 cycles in Figure 4. In Figure 9, I connect the filter inductance 31 in series with the direct current output. An alternating current path may be provided in Figure 9 as in Figures 1 and 3, through the use of a capacitor 30 or a series combination of inductance 64 and capacitor 65. The over-load protection arrangement shown in Figure 9 is, in operation, essentially the same as that shown in Figure 4 but the method of connection is modified because of the six-phase transformer arrangement. In order to avoid the necessity for providing a series winding in each one of the six A. C. lines, the neutral connection of the A. C. transformer 156 is opened and the current transformer windings 84, 86 and 88 are delta connected to the three wires from transformer 156 to provide the neutral connection.

The transformers 81, 82 and 83 are essentially the same as in Figure 4 and are provided with taps 90, 91 and 92 for supplying the three-phase rectifier 96. The output windings 85, 87 and 89 have the loading condensers 93, 94 and 95 delta connected across their terminals. With this arrangement, the voltage supplied to the loading condensers is considerably greater than that supplied to the rectifiers 96, and a relatively small economical size of condenser can be used for this purpose. As in Figure 4 the negative output terminal of the rectifier 96 is connected to the negative terminal 33 of the battery charger, while the positive terminal of the rectifiers 96 is connected through terminals 77 and 78 and through the control windings 109, 111, 113, 147, 149 and 151 to the positive terminal 32 of the battery charger.

The source of reference potential is connected across the output terminals 32 and 33 through the control windings 110, 112, 114, 148, 150 and 152. These windings are respectively shunted by the resistors 61, 62, 63, 153, 154 and 155. The function of these resistors is the same as described in connection with the resistors 61, 62 and 63 in Figure 3. They serve as an effective short circuit to alternating current in the windings across which they are shunted, while at the same time they do not shunt any appreciable portion of the unidirectional control current away from the control windings. As previously mentioned, the purpose of this arrangement is to reduce the effective impedance of the reactors under its minimum impedance condition and to effectively reduce the inverse voltage across the rectifier elements, while at the same time providing a damping action to prevent hunting.

In the circuit arrangement shown in Figure 9 the current from the source of reference potential is provided with two paths between the positive terminal 75 and the positive terminal 32 of the battery charger. The purpose of providing two paths is to maintain as low a resistance between these two points as is possible, while at the same time maintaining an even distribution of loading between the various rectifier elements. The one current path comprises the control windings 110, 112 and 114, while the other current path comprises the windings 148, 150 and 152. The resistances of these two paths are preferably made substantially the same so that the current flowing through the windings is the same in both cases and a uniform distribution of load is assured. The control windings 109, 111, 113, 147, 149 and 151 which are energized by the overload protection arrangement are connected in series to the positive terminal 32. As in the previous figures, these windings are polarized so that the current passed from the rectifier 96 tends to demagnetize the reactor cores and limit the output current to the specified safe value.

My invention, and in particular the embodiment of my invention shown in Figure 9 has another great advantage over the controlled rectifying arrangements generally used in the prior art. This is the result of the fact that each rectifier has a reactor in series with it. These reactors act as control reactors, and, as previously mentioned, the same winding that acts as an impedance winding also acts as a saturating winding for the reactor. Nevertheless, the reactors also can be used as filter impedances so that the filter inductance 31 shown in Figure 9 may be omitted in very many instances, as is done in Figure 4. When the filter inductance 31 is omitted and the terminals 32 and 33 are connected directly across a storage battery, the storage battery provides a very low impedance path for alternating current to flow in the direct current circuit. When this is the case, the controlling reactors also act as filter inductances, inasmuch as they present an impedance in the path of the rectifiers which is considerably greater than the impedance presented by the storage battery connected across terminals 32 and 33. Thus, by my invention the filtering of the rectified output is in many cases accomplished by the same elements which control the output voltage.

This filtering action is also obtained in the circuits of Figures 1 and 3 which show an alternating current path shunted across the direct current output of the rectifiers, followed by a direct current filter inductance in the output circuit. With these combinations of an alternating current shunting path with a series filter inductance, the effective action obtained is that of a two-stage filter even though only one stage is shown external to the control circuit. The low impedance path for the ripple current provided by the capacitor 30 in Figure 1 or by the resonant circuit comprising inductance 64 and capacitor 65 in Figure 3 cooperates with the controlling inductances to greatly reduce the ripple voltage which is supplied to the filter inductance 31 in Figure 1, or the filter inductance 66 in Figure 3.

It will be apparent that the various modifications shown in the several figures may be, for the most part, interchanged between the various drawings, and numerous other modifications not shown may be employed without departing from the true scope of my invention. The specific embodiments of my invention shown herein are given merely by way of example and numerous changes in the details of construction and the combination and arrangement of parts may be restorted to without departing from the spirit and scope of my invention as hereinafter claimed.

I claim as the invention:

1. A regulated rectifying arrangement comprising in combination, a set of alternating current terminals, a pair of direct current terminals, means for supplying alternating current to said alternating current terminals, a rectifier element connected between each of said alternating current terminals and each of said direct current terminals, a control reactor connected in series with each of said rectifier elements, control winding means on said control reactors, a source of reference potential, a control circuit including said source of reference potential and said control windings, said control circuit extending from one to the other of said direct current terminals, and a series resonant circuit connected across said direct current terminals providing a low impedance path for ripple-frequency voltage appearing across said direct current terminals.

2. In combination, a plurality of iron cores, each having first, second, and third core members a pair of direct current output terminals and a plurality of alternating current input terminals, a first winding on the first core member of each of said magnetic cores, circuit means for connecting each of said first windings in series with a rectifying element between one of said alternating current terminals and one of said direct current terminals, a third winding on each of the third core members of said magnetic cores, circuit means for connecting each of said windings in series with a rectifying element between one of said alternating current terminals and one of said direct current terminals, the first and third windings on each of said magnetic cores being polarized to provide additive unidirectional flux components in the second core member, a control winding on the second core member of each of said cores, said control windings being connected between a source of reference potential and the direct current ouput terminals, whereby the saturation of said cores is controlled in response to differences between the voltage across said output terminals and that of said source of reference potential, whereby said output voltage is maintained at substantially the value determined by the source of reference potential.

3. A controlled rectifying arrangement adapted to be energized by a polyphase source of alternating current and to supply a regulated direct current output voltage, comprising in combination, a reactor for each of the phases of said source, each reactor having first, second and third core members, a pair of direct current output terminals, an alternating current input terminal for each of the phases, a first reactor winding on the first core member of each of said reactors, a second reactor winding on the third core member of each of said reactors, a circuit including the first reactor winding in series wit a rectifying element connected between an alternating current terminal and a direct current terminal, another circuit extending from said alternating current terminal to the other direct current terminal, and including the second winding in series with a second rectifying element, a control winding on the second core member of each of said reactors, a source of reference potential, circuit means for energizing said windings with the difference in potential between said source of reference potential and the rectified voltage across said direct current terminals, said first and second control windings being polarized to produce additive unidirectional fluxes in said third core member, and means for suppressing fluctuations in the flux in said third core member.

4. A three-phase rectifying arrangement having three alternating current terminals and a pair of direct current terminals, six rectifying elements, six control reactors, one of said reactors being connected in series with one of said rectifiers between each of said alternating current terminals and each of said direct current terminals, a control winding on each of said reactors, the control windings for the reactors associated with each one of the alternating current terminals being connected in series with each other, a resistor connected across each of said pairs of control windings, a source of reference potential connected across said direct current terminals through said control windings, the difference in voltage between the source of reference potential and that across the direct current terminals being impressed upon the control windings to alter the saturation of said control reactors to maintain the voltage across said direct current terminals at substantially the same value as the reference potential voltage, said resistors connected across the pairs of control windings serving to equalize the alternating current potentials across the pair of windings.

5. In combination, a first three-phase rectifying arrangement and a second three-phase rectifying arrangement, a source of reference potential, means for energizing the first rectifying arrangement with alternating current, means for energizing the second rectifying arrangement with alternating current displaced substantially 30° in phase from that supplied to the first rectifying arrangement, each of said rectifying arrangements having three alternating current terminals and a pair of direct current terminals and comprising three reactors, each having first, second and third core members, first and third windings on the first and third core members, the first winding being connected between an alternating current terminal and a direct current terminal in series with a rectifying element, the second winding being connected between said alternating current terminal and the other direct current terminal through another rectifying element, control winding means on the third core member of each reactor, and means for energizing said control windings in response to the difference in potential between that across said direct current terminals and that across the source of reference potential, the direct current terminals of said first rectifying arrangement being connected to the direct current terminals of said second rectifying arrangement, whereby ripple voltages of six times the frequency of the alternating current source are cancelled in the direct current output of said system.

6. A regulated rectifying arrangement adapted to be energized from a source of polyphase alternating current and comprising in combination a plurality of reactor elements, a plurality of rectifying elements, a plurality of alternating current terminals, and a pair of direct current terminals, means for connecting one of said reactor elements in series with one of said rectifying elements between each alternating current terminal and at least one of said direct current terminals, a source of reference potential, a control winding on each of said reactor elements, and means for connecting said source of reference potential in parallel with said direct current terminals through said control windings, impedance means, and means for energizing said impedance means substantially in series with said rectifying arrangement, control rectifying means, said control rectifying means being energized substantially in parallel with said impedance means, a second control winding on each of said reactor elements, the output of said control rectifying means being connected across said direct current terminals through said second control windings, whereby the magnetization of said reactors is decreased when the voltage of said control rectifier exceeds the voltage across the direct current terminals.

7. A controlled rectifying arrangement adapted to be energized by a polyphase source of alternating current and to supply a regulated direct current output voltage, comprising in combination, a reactor for each of the phases of said source, each reactor having first, second and third core members, a pair of direct current output terminals, an alternating current input terminal for each of the phases, a first reactor winding on the first core member of each of said reactors, a second reactor winding on the third core member of each of said reactors, a circuit including the first reactor winding in series with a rectifying element connected between an alternating current terminal and a direct current terminal, another circuit extending from said alternating current terminal to the other direct current terminal, and including the second winding in series with a second rectifying element, a control winding on the second core member of each of said reactors, a source of reference potential, circuit means for energizing said windings with the difference in potential between said source of reference potential and the rectified voltage across said direct current terminals, said first and second control windings being polarized to produce additive unidirectional fluxes in said third core member.

8. In combination with a controlled rectifying arrangement comprising direct current controlled reactance means together with first rectifying means, a control circuit comprising current transformer means having primary and secondary winding means, means for connecting the primary winding means between said first rectifying means and a source of alternating current, capacitive reactance means connected across said secondary winding means, second rectifying means energized from said secondary winding means, a closed circuit including the first and second rectifying means in series opposition and including means for reducing the saturation of said direct current controlled reactance means when the output voltage of said second rectifying means exceeds the output voltage of said first rectifying means.

9. In combination with a controlled rectifying arrangement comprising direct current controlled reactance means together with first rectifying means and having direct current output terminals, a control circuit comprising current transformer means, means for energizing said rectifying arrangement from a source of alternating current through said current transformer means, capacitive reactance means substantially in parallel with said current transformer means, second rectifying means energized from said current transformer means, saturating winding means on said direct current controlled reactance means, and a closed circuit extending between said direct current output terminals and including said saturating winding means in series with said second rectifying means, the current from said second rectifying means through said saturating winding means reducing the saturation of said direct current controlled reactance means when the voltage of said second rectifying means exceeds the voltage across said direct current output terminals.

10. In a system for supplying unidirectional current to a pair of load terminals and comprising rectifying means, a reference voltage rectifier energized from an alternating current circuit which includes turns on a saturable magnetic core, regulating means responsive to the voltage of said reference voltage rectifier and an energizing circuit for supplying alternating current to said rectifying means; the combination of impedance means serially connected in said energizing circuit, an auxiliary rectifier energized from said impedance means, core saturating winding means on said saturable magnetic core and a closed circuit extending between said load terminals and including the auxiliary rectifier in series with said core saturating winding means, whereby the current delivered by the auxiliary rectifier through said core saturating winding means reduces the voltage of said reference voltage rectifier whenever the unidirectional current supplied to the load terminals exceeds a predetermined value.

11. In a system for supplying unidirectional current to a pair of load terminals and comprising rectifying means, a reference voltage rectifier energized from an alternating current circuit which includes turns on a saturable magnetic core, regulating means responsive to the voltage of said reference voltage rectifier and an energizing circuit for supplying alternating current to said rectifying means; the combination of current transformer means serially connected in said energizing circuit, an auxiliary rectifier energized from said current transformer means, core saturating winding means on said saturable magnetic core and a closed circuit extending between said load terminals and including the auxiliary rectifier in series with said core saturating winding means, whereby the current delivered by the auxiliary rectifier through said core saturating winding means reduces the voltage of said reference voltage rectifier whenever the unidirectional current supplied to the load terminals exceeds a predetermined value.

12. In a controlled rectifying arrangement comprising first rectifying means and direct current controlled reactance means serially connected between alternating current input terminals and direct current load terminals, the combination of second rectifying means energized from an alternating current regulating circuit including turns on a saturable magnetic core, current transformer means serially connected between the alternating current input terminals and the first rectifying means, third rectfying means energized from the current transformer means, first and second saturating winding means on the controlled reactance means, a first circuit extending from the second rectifying means to the load terminals and including the first saturating winding means, third saturating winding means on said saturable magnetic core, and a second circuit extending from the third rectifying means to the load terminals and including the second and third saturating winding means, the output of the second rectifying means being a reference voltage and the output of the third rectifying means being effective in increasing the reactance of the direct current controlled reactance means and reducing the reference voltage for values of load current greater than a predetermined value.

HENRY M. HUGE.

References Cited in the file of this patent

UNITED STATES PATENTS

| Number | Name | Date |
|---|---|---|
| 1,834,416 | Osgood | Dec. 1, 1931 |
| 1,943,088 | Power | Jan. 9, 1934 |
| 1,993,914 | Bohm | Mar. 12, 1935 |
| 2,000,189 | Power | May 7, 1935 |
| 2,040,492 | Logan | May 12, 1936 |
| 2,177,556 | Walker | Oct. 24, 1939 |
| 2,309,156 | Andrews | Jan. 26, 1943 |
| 2,373,383 | Christopher | Apr. 10, 1945 |
| 2,377,180 | Pohm | May 29, 1945 |
| 2,403,891 | Lamm | July 9, 1946 |
| 2,423,114 | Potter | July 1, 1947 |